US011048374B2

(12) United States Patent
Sundar

(10) Patent No.: US 11,048,374 B2
(45) Date of Patent: Jun. 29, 2021

(54) ONLINE PLUGGABLE 3D PLATFORM FOR 3D REPRESENTATIONS OF ITEMS

(71) Applicant: eBay Inc., San Jose, CA (US)

(72) Inventor: Nataraj Sundar, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 15/915,515

(22) Filed: Mar. 8, 2018

(65) Prior Publication Data

US 2019/0278458 A1    Sep. 12, 2019

(51) Int. Cl.
*G06F 17/00* (2019.01)
*G06F 3/0481* (2013.01)
*G06T 15/00* (2011.01)
*G06F 3/0484* (2013.01)
*G06F 9/451* (2018.01)
(Continued)

(52) U.S. Cl.
CPC ........ *G06F 3/04815* (2013.01); *G06F 3/0482* (2013.01); *G06F 3/04845* (2013.01); *G06F 9/451* (2018.02); *G06Q 30/06* (2013.01); *G06T 15/005* (2013.01); *G06T 2200/24* (2013.01)

(58) Field of Classification Search
CPC .... G06F 3/04815; G06F 9/451; G06F 3/0482; G06F 3/04845; G06F 3/0484; G06T 15/005; G06T 2200/24; G06Q 30/0643; G06Q 30/0601; G06Q 10/10; G06Q 10/20;
(Continued)

(56) References Cited

U.S. PATENT DOCUMENTS 5,010,502 A * 4/1991 Diebel ............. G06T 17/10
345/419
6,057,856 A    5/2000 Miyashita et al.
(Continued)

FOREIGN PATENT DOCUMENTS

GB       2527582 A    12/2015
WO   2019/173012 A1    9/2019

OTHER PUBLICATIONS

International Search Report for PCT Application No. PCT/US2019/015856, dated Apr. 18, 2019, 5 pages.
(Continued)

*Primary Examiner* — Jason T Edwards
(74) *Attorney, Agent, or Firm* — FIG. 1 Patents

(57) ABSTRACT

A machine may be configured to provide an online pluggable three-dimensional platform for publication of three-dimensional representations of items. For example, the machine generates a first software unit that corresponds to the three-dimensional representation of the item, and a second software unit that corresponds to an online three-dimensional platform that is pluggable to include the three-dimensional representation of the item corresponding to the first software unit. The online three-dimensional platform includes one or more pluggable slots for receiving one or more three-dimensional representations of one or more items. The machine generates an enhanced user interface on the client device based on causing an execution of the first software unit and the second software unit. The causing of the execution results in a display, in the enhanced user interface of the client device, of the three-dimensional representation of the item plugged into a pluggable slot of the online three-dimensional platform.

20 Claims, 10 Drawing Sheets

(51) Int. Cl.
*G06F 3/0482* (2013.01)
*G06Q 30/06* (2012.01)

(58) Field of Classification Search
CPC .... G06Q 30/06; G06Q 30/02; G06Q 30/0625; G06Q 10/087
USPC ......................................................... 715/719
See application file for complete search history.

(56) References Cited

U.S. PATENT DOCUMENTS

| | | | | |
|---|---|---|---|---|
| 9,536,344 | B1* | 1/2017 | Baszucki | ................ G06T 13/40 |
| 9,563,906 | B2 | 2/2017 | Stark | |
| 9,633,465 | B2 | 4/2017 | Hamilto et al. | |
| 2002/0072993 | A1* | 6/2002 | Sandus | ................ G06Q 30/02 |
| | | | | 705/26.62 |
| 2004/0205695 | A1* | 10/2004 | Fletcher | .................... G06F 8/20 |
| | | | | 717/105 |
| 2006/0274060 | A1* | 12/2006 | Ni | ......................... G06F 3/0482 |
| | | | | 345/419 |
| 2007/0179867 | A1* | 8/2007 | Glazer | ............... G06Q 30/0253 |
| | | | | 705/26.43 |
| 2009/0231328 | A1 | 9/2009 | Schwartz | |
| 2010/0077311 | A1* | 3/2010 | Santoro | ................. G06F 16/958 |
| | | | | 715/738 |
| 2012/0075432 | A1* | 3/2012 | Bilbrey | .................. G06T 7/593 |
| | | | | 348/48 |
| 2012/0150667 | A1* | 6/2012 | Salah | ................ G06Q 30/0241 |
| | | | | 705/14.73 |
| 2013/0097554 | A1 | 4/2013 | Wyeld | |
| 2013/0181975 | A1* | 7/2013 | Golden | .................... G06T 17/00 |
| | | | | 345/419 |
| 2014/0025420 | A1* | 1/2014 | Joshi | ...................... G06Q 10/08 |
| | | | | 705/7.23 |
| 2014/0108208 | A1 | 4/2014 | Piana | |
| 2014/0129354 | A1* | 5/2014 | Soon-Shiong | ....... G06Q 10/087 |
| | | | | 705/16 |
| 2014/0222627 | A1 | 8/2014 | Kukreja et al. | |
| 2015/0356520 | A1* | 12/2015 | Mitti | .................... G06Q 10/087 |
| | | | | 705/305 |
| 2016/0019717 | A1* | 1/2016 | Yopp | .................... G06Q 10/067 |
| | | | | 345/633 |
| 2016/0292966 | A1 | 10/2016 | Denham | |
| 2016/0335712 | A1 | 11/2016 | Tapley et al. | |
| 2017/0132836 | A1* | 5/2017 | Iverson | ................... G06T 15/04 |
| 2017/0249693 | A1* | 8/2017 | Greenwood | ............ G06T 15/00 |
| 2017/0336941 | A1* | 11/2017 | Gribetz | ............. G06F 3/04815 |
| 2018/0005035 | A1* | 1/2018 | Bogolea | ............. G06K 9/2063 |
| 2018/0114264 | A1* | 4/2018 | Rafii | ...................... G06T 15/50 |
| 2018/0260988 | A1* | 9/2018 | Huang | .................. G06F 3/1454 |

OTHER PUBLICATIONS

International Written Opinion for PCT Application No. PCT/US2019/015856, dated Apr. 18, 2019, 8 pages.
International Search Report received for PCT Application No. PCT/US2019/015856, dated Sep. 17, 2020, 10 pages.

* cited by examiner

ONLINE PLUGGABLE 3D PLATFORM FOR 3D REPRESENTATIONS OF ITEMS

TECHNICAL FIELD

Embodiments of the present disclosure relate generally to providing an online pluggable three-dimensional platform for publication of three-dimensional representations of items, and, more particularly, but not by way of limitation, to generating an enhanced user interface for displaying an online pluggable three-dimensional platform for presenting three-dimensional representations of items.

BACKGROUND

Generally, web sites that publish digital content pertaining to items of interest to the public present such digital content as listings that include various information about the items. An example of such digital content is a listing published on behalf of a seller of a product. A user interface of a client device may present listings of products that may include one or more photographs of the product, and a description of one or more attributes of the product.

Conventional user interfaces have many deficits relating to the efficient functioning of the computer, requiring a user of a conventional user interface to scroll around and switch views many times to find the right data associated with an item, especially when the conventional user interface is displayed on a small screen.

BRIEF DESCRIPTION OF THE DRAWINGS

Various ones of the appended drawings merely illustrate example embodiments of the present disclosure and cannot be considered as limiting its scope.

Figure 1:
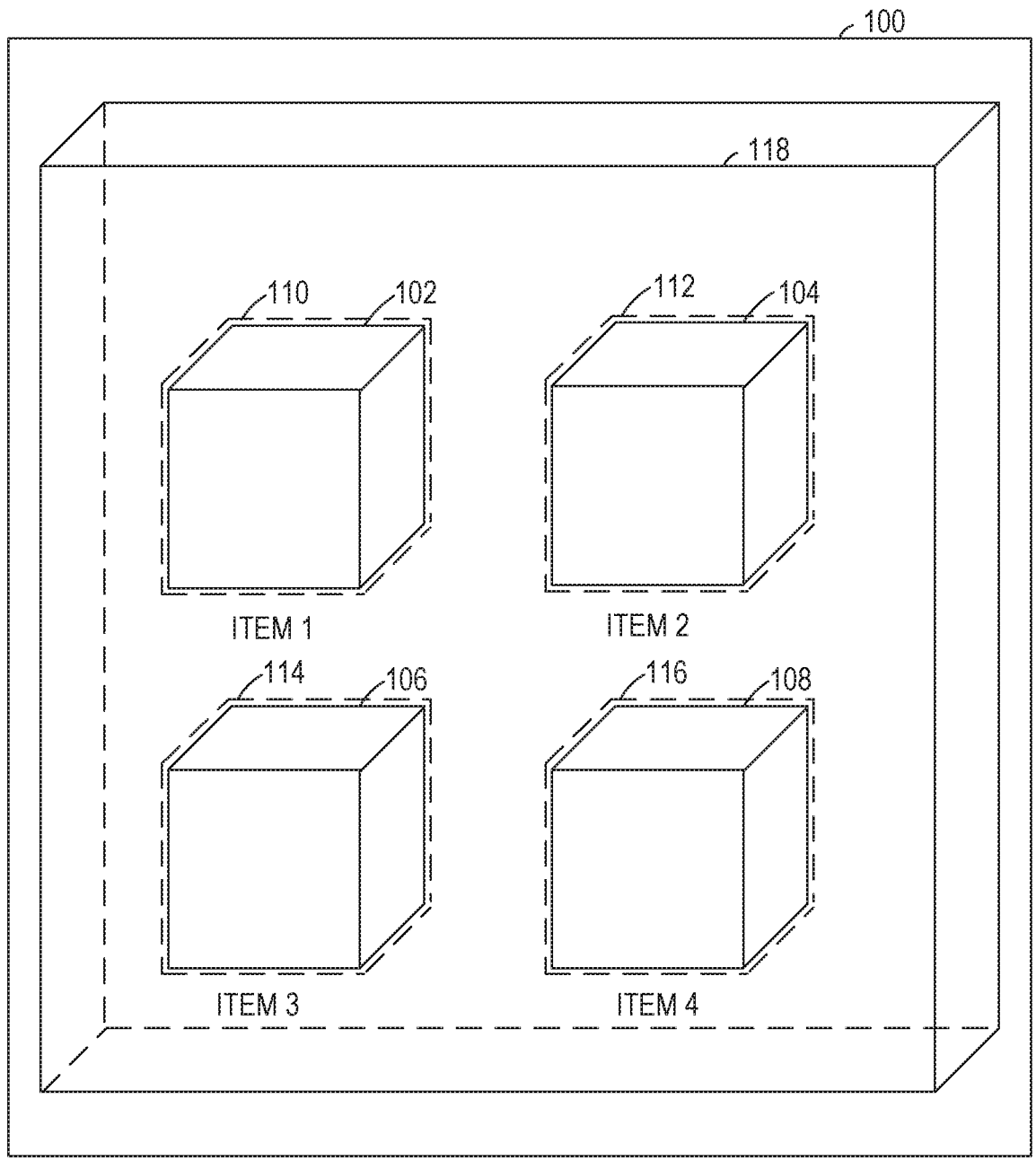
FIG. 1 is a block diagram illustrating an online pluggable three-dimensional platform for publishing three-dimensional representations of items, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Generally, web sites that publish digital content pertaining to items of interest to the public present such digital content as listings that include various information about the items. An example of such digital content is a listing published on behalf of a seller of a product. A user interface of a client device may present listings of products that may include one or more photographs of the product, and a description of one or more attributes of the product.

Conventional user interfaces have many deficits relating to the efficient functioning of the computer, requiring a user of a conventional user interface to scroll around and switch views many times to find the right data associated with an item, especially when the conventional user interface is displayed on a small screen. Because small screens tend to need data and functionality divided into many layers or views, conventional user interfaces require users to drill down through many layers to get to desired data or functionality. That process could seem slow, complex and difficult to learn, particularly to novice users. Further, that process decreases data processing speeds, and is often associated with higher data storage requirements.

In some example embodiments, a publication system that provides an online pluggable three-dimensional platform for publication of three-dimensional representations of items improves conventional user interfaces by presenting the information pertaining to the items in a particular way in electronic devices that results in the delivery of more information pertaining to the item at the time a visualization of the online three-dimensional platform is presented to a user. The improved functionality of the user interface of the electronic device also enhances the efficiency of the electronic devices by improving data processing speeds and data storage efficiency.

The online pluggable three-dimensional (hereinafter also "3D") platform may be a virtual space that can be filled or unfilled (plugged or unplugged) with different content in a plurality of three-dimensional slots, as desired. The slots may have a 3D appearance, dimensioned according to a specification, and may have a common (or modular) form and size.

In some example embodiments, the publication system generates an enhanced user interface for display on a client device. The enhanced user interface presents an online pluggable 3D platform for publication of three-dimensional representations of items. The online pluggable 3D platform may be associated with an administrator who, in some instances, has the ability to customize the look-and-feel of the online pluggable 3D platform, to upload 3D representations of the items to the publication system, to request modifications to the online pluggable 3D platform (hereinafter also "3D platform" or "three-dimensional platform") or to the 3D representations of the items, etc.

In various example embodiments, the online pluggable three-dimensional platform is an online 3D store-front for an online store associated with a seller of one or more items. The online store may be an independent online ecommerce store, or an online store associated with an online marketplace. The online pluggable three-dimensional platform is configured to include one or more pluggable areas (or slots) for receiving and displaying 3D representations of various items (e.g., products for sale by an online seller). In some instances, the pluggable slots are visible in the interface of the 3D platform. A user may drag and drop representations (e.g., 3D representations or 2D representations) into the 3D pluggable slots. If the user drags and drops a 2D representation of an item into a pluggable slot, the publication system may generate a 3D representation of the item based on the 2D representation. In some instances, the pluggable slots are not visible in the interface of the 3D platform. The items that serve as basis of the 3D representations plugged into the online pluggable 3D platform associated with a seller may be of the same type (e.g., water bottles, clothing, cars, etc.) or of various types (e.g., a combination of books, antiques, clothing, etc.).

In certain example embodiments, the 3D representations of items are received from a client device associated with an administrator of the online pluggable 3D platform, such as a seller of the items. The administrator may generate a virtual view file by capturing a virtual view of an item, and may transmit the virtual view file to the publication system for use in publication of the 3D representation of the item on the online pluggable 3D platform. In some instances, the virtual view of the item includes a 360-degree video of the item, a virtual reality (VR) image, a virtual tour, etc.

In some example embodiments, the client device associated with the administrator transmits one or more 2D images (e.g., photographs, drawings, sketches, etc.) of the item and/or additional information (e.g., measurements, brand information, etc.) pertaining to the item to the publication system, and the publication system generates the 3D representation based on the 2D images of the item and/or the additional information pertaining to the item.

The 3D platform includes one or more pluggable slots, which, in some instances, conform to a certain specification. The specification may provide various requirements pertaining to the slots and to the 3D representations of the items that will be plugged into the slots of the 3D platform. The specification may describe measurements of the slots (and of the 3D representations of the items that will be plugged into the slots). In some instances, the slots have the same measurements, such that a 3D representation of an item may be moved from one platform slot to another platform slot without modifying the size of the 3D representation of the item. This allows for a fast ordering of the 3D representations of items in the 3D platform, and a fast visualization associated with such ordering. Further, the specification of a common size for the slots of a 3D platform and for the 3D representations of items allows for a cohesive look-and-feel of the 3D platform, and for the re-use of the 3D representations of items by the publication system. The re-use of the 3D representations of items further enhances the publication system by providing a more efficient data storage and increasing data processing speeds.

In some example embodiments, the publication system accesses a three-dimensional representation of an item at a record of a database. The three-dimensional representation of the item, in some instances, is received from a client device of an administrator of the three-dimensional platform. Administrators associated with the client devices that transmit the three-dimensional representation may be provided with instructions dimensions, specs, ranges of distance, etc.) for capturing 3D images of items in order to obtain accurate and consistent information about the items. This may assist in normalizing the visualization of similar items when presenting information about the items to users.

In some instances, the three-dimensional representation of the item is generated based on information that pertains to the item and that is received from the client device.

The publication system generates a first software unit that corresponds to the three-dimensional representation of the item. The first software unit includes software code the execution of which renders the three-dimensional representation of the item in a user interface of the client device. The publication system may store the first software unit in association with metadata pertaining to the item, to the client device, or to the first software device in a software unit repository. The various software units stored in the software unit repository may be accessed and re-used for populating various three-dimensional platforms. Each software unit in the software unit repository is uniquely identifiable based on an item identifier associated with the item represented in the software unit. Each software unit in the software unit repository is associated with a particular version based on a version of the item (e.g., change in the item, such as a modified attribute of the item) represented in the software unit.

The publication system generates a second software unit that corresponds to an online three-dimensional platform that is pluggable to include the three-dimensional representation of the item corresponding to the first software unit. The online three-dimensional platform includes one or more pluggable slots for receiving one or more three-dimensional representations of one or more items including the three-dimensional representation of the item. The second software unit includes software code whose execution renders the online three-dimensional platform in the user interface of the client device.

The second software unit may include information pertaining to the look-and-feel of the 3D platform, an identifier of the number of pluggable slots within the 3D platform, data pertaining to the location of the pluggable slots within the 3D platform, as well as one or more attributes associated with the pluggable slots, such as the orientation of the pluggable slots within the 3D platform.

The publication system generates an enhanced user interface on the client device based on causing an execution of the first software unit and the second software unit. The causing of the execution results in a display, in the enhanced user interface of the client device, of the three-dimensional representation of the item plugged into a pluggable slot of the one or more pluggable slots of the online three-dimensional platform. The online three-dimensional platform is configured to be pluggable with the one or more three-dimensional representations of the one or more items including the three-dimensional representation of the item.

In some example embodiment, a plurality of 3D representations of items are included in the 3D platform published in the enhanced user interface on the client device. The causing of the execution of the first software unit that corresponds to the first 3D representation, and the second software unit that corresponds to the 3D platform includes an execution of a plurality of software units that correspond to the plurality of 3D representations of items, and the second software unit that corresponds to the 3D platform. The causing of the execution results in the insertion of the plurality of 3D representations of items in a plurality of pluggable slots of the 3D platform, as displayed in a user interface.

Following is an example of pseudo-code that may represent a master script executed to render a plurality of 3D representations of items in a 3D platform for an online store caused to display in an enhanced user interface of a client device:

```
<VR store front>
    ...
    <VR software unit 1>
    ...
    </VR software unit 1>
    ...
    <VR software unit n>
    ...
    </VR software unit n>
</VR store front>
```

The publication system may generate the master script based on the software units that correspond to the 3D representations of the items (e.g., one or more VR software units), and the software unit that corresponds to the 3D platform VR store front). In some example embodiments, when a request to access a web site associated with the online store is received from the client device, the publication system accesses the master script from a database record, reads the master script, accesses the software unit files listed in the master script, generates an enhanced user interface to render and populate the 3D platform corresponding to the store-front with the 3D representations of the items. The generating of the enhanced user interface may be dynamic and near real-time.

In the example of the 3D platform being a store-front for an online store, the items are listed on the 3D platform by virtue of displaying 3D representations of the items in the pluggable slots of the 3D platform. A visitor to the online store, at the time of selecting to view the web site associated with the online store, may be shown, and may view 3D representations of the various items available for sale on the online store. For instance, the visitor may view a 360-degree video of a particular item for sale on the online store by selecting a particular 3D representation displayed in a particular pluggable slot of the 3D platform.

FIG. 1 is a block diagram illustrating an online pluggable three-dimensional platform for publishing three-dimensional representations of items, according to some example embodiments. As shown in FIG. 1, user interface 100 displays a 3D platform 118 for publishing a plurality of 3D representations for a plurality of items (e.g., 3D representation 102 for item 1, 3D representation 104 for item 2, 3D representation 106 for item 3, and 3D representation 108 for item 4). In some example embodiments, 3D platform 118 is a store-front for an online store, and the plurality of 3D representations provide 3D information (e.g., a VR view, a 360-degree video, etc.) for a plurality of items for sale in the online store. The providing of 3D information for an item via the 3D platform obviates the need for a user to search for various information pertaining to the item by navigating to various pages associated with the item on an online store's web site.

As shown in FIG. 1, the 3D platform includes a plurality of pluggable slots (e.g., slots 110, 112, 114, and 116) to receive 3D representations of items. Various attributes associated with the slots (and with the corresponding 3D representations) may be customized by the publication system based on a customized request received from the client device associated with an administrator of the store-front.

In some example embodiments, one or more of the 3D representations of the items are virtual reality (VR) views of one or more items. Using a VR viewer, a user can view an item in the context of the location where the VR view of the item was created.

In various example embodiments, one or more of the 3D representations in FIG. 1 are pre-existing 3D representations that were previously stored at a record of database and that are selected by the administrator to populate one or more of the slots 110, 112, 114, or 116. In some instances, the record of the database may store a plurality of versions of software units that correspond to a plurality of versions of 3D representations of an item (e.g., a product). Based on the administrator selecting a particular version of a 3D representation of an item, the publication system associates a particular software unit version corresponding to the particular version of the 3D representation of the item with an identifier of a pluggable slot of the 3D platform.

In certain example embodiments, one or more of the 3D representations of items published via the 3D platform are provided by the administrator to the publication system via the client device, and one or more of the 3D representations of items published via the 3D platform are selected by the administrator from one or more existing 3D representations previously stored in a record of a database associated with the publication system.

According to some example embodiments, a request to access data associated with a web site of an online store-front is received from a client device at a server of the publication system. The server, based on the request, transmits the master script associated with the online store-front to the client device. The client device executes the master script, requests the software units referenced in the master script from the server, receives the software units, and renders, in an enhanced user interface of the client device, the 3D platform and the 3D representations of the items 1, 2, 3, and 4 at the locations corresponding to the plurality of slots included in the 3D platform.

Figure 2:
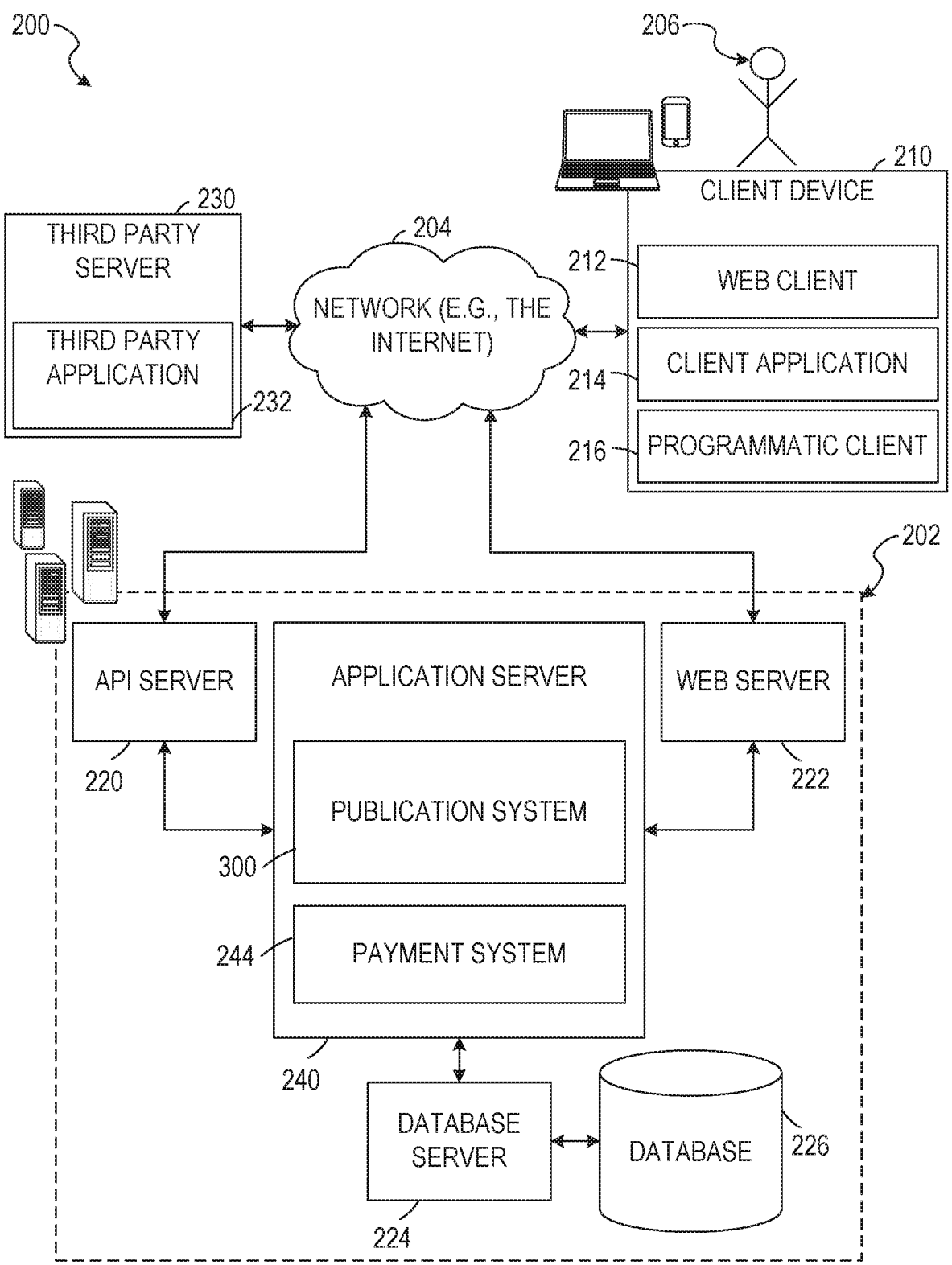
FIG. 2 is a block diagram illustrating a networked system, according to some example embodiments.

With reference to FIG. 2, an example embodiment of a high-level client-server-based network architecture 200 is shown. A networked system 202 provides server-side functionality via a network 204 (e.g., the Internet or wide area network (WAN)) to one or more client devices 210. FIG. 2 illustrates, for example, a web client 212 (e.g., a browser, such as the Internet Explorer® browser developed by Microsoft® Corporation of Redmond, Wash. State), a client application 214, and a programmatic client 216 executing on client device 210.

The client device 210 may comprise, but is not limited to, mobile phones, desktop computers, laptops, portable digital assistants (PDAs), smart phones, tablets, ultra books, netbooks, multi-processor systems, microprocessor-based or programmable consumer electronics, game consoles, set-top boxes, wearable devices, smart watches, or any other communication devices that a user may utilize to access the networked system 202. In some embodiments, the client device 210 may comprise a display module to display information (e.g., in the form of user interfaces). In further embodiments, the client device 210 may comprise one or more of a touch screens, accelerometers, gyroscopes, cameras, microphones, global positioning system (GPS) devices, and so forth. The client device 210 is a device of a user that can be used to perform a transaction involving digital items within the networked system 202. In some example embodiments, the networked system 202 comprises a network-based marketplace that responds to requests for product listings, publishes publications comprising item listings of products or services available on the network-based marketplace, and manages payments for these marketplace transactions. One or more portions of network 204 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 210 may include one or more applications (also referred to as "apps") such as, but not limited to, a web browser messaging application, electronic mail (email) application, an e-commerce site application (also referred to as a marketplace application), and the like. In some embodiments, if the e-commerce site application is included in the client device 210, then this application is configured to locally provide the user interface and at least some of the functionalities with the application configured to communicate with the networked system 202, on an as needed basis, for data or processing capabilities not locally available (e.g., to access to a database of items available for sale, to authenticate a user, to verify a method of payment, etc.). Conversely, if the e-commerce site application is not included in the client device 210, the client device 210 may use its web browser to access the e-commerce site (or a variant thereof) hosted on the networked system 202.

One or more users 206 may be a person, a machine, or other means of interacting with the client device 210. In example embodiments, the user 206 is not part of the network architecture 200, but may interact with the network architecture 200 via the client device 210 or other means. For instance, the user 206 provides input (e.g., touch screen input or alphanumeric input) to the client device 210 and the input is communicated to the networked system 202 via the network 204. In this instance, the networked system 202, in response to receiving the input from the user 206, communicates information to the client device 210 via the network 204 to be presented to the user 206. In this way, the user 206 can interact with the networked system 202 using the client device 210.

An application program interface (API) server 220 and a web server 222 are coupled to, and provide programmatic and web interfaces respectively to, one or more application servers 240. The application servers 240 may host a publication system 300 and a payment system 244, each of which may comprise one or more modules or applications and each of which may be embodied as hardware, software, firmware, or any combination thereof. The application servers 240 are, in turn, shown to be coupled to one or more database servers 224 that facilitate access to one or more information storage repositories or databases 226. In an example embodiment, the databases 226 are storage devices that store information to be posted (e.g., publications, listings, digital content items, etc.) to the publication system 300. The databases 226 may also store digital item information, in accordance with example embodiments.

Additionally, a third party application 232, executing on one or more third party servers 230, is shown as having programmatic access to the networked system 202 via the programmatic interface provided by the API server 220. For example, the third party application 232, utilizing information retrieved from the networked system 202, supports one or more features or functions on a website hosted by the third party. The third party website, for example, provides one or more promotional, marketplace, or payment functions that are supported by the relevant applications of the networked system 202.

The publication system 300 provides a number of publication functions and services to users 206 that access the networked system 202. For example, the publication system 300 facilitates the generation and online publishing of customizable three-dimensional representations of items on an online pluggable three-dimensional platform displayed at a client device. The payment system 244 provides a number of functions to perform or facilitate payments and transactions. While the publication system 300 and payment system 244 are shown in FIG. 2 to both form part of the networked system 202, it will be appreciated that, in alternative embodiments, each system 300 and 244 may form part of a service that is separate and distinct from the networked system 202. In some embodiments, the payment system 244 may form part of the publication system 300.

Further, while the client-server-based network architecture 200 shown in FIG. 2 employs a client-server architecture, the present inventive subject matter is of course not limited to such an architecture, and could equally well find application in a distributed, or peer-to-peer, architecture system, for example. The publication system 300 and payment system 244 could also be implemented as standalone software programs, which do not necessarily have networking capabilities.

The web client 212 accesses the publication system 300 or the payment system 244 via the web interface supported by the web server 222. Similarly, the programmatic client 216 accesses the various services and functions provided by the publication system 300 or the payment system 244 via the programmatic interface provided by the API server 220. The programmatic client 216 may, for example, be a seller application (e.g., the Turbo Lister application developed by eBay® Inc., of San Jose, Calif.) to enable sellers to author and manage listings on the networked system 202 in an off-line manner, and to perform batch-mode communications between the programmatic client 216 and the networked system 202.

Figure 3:
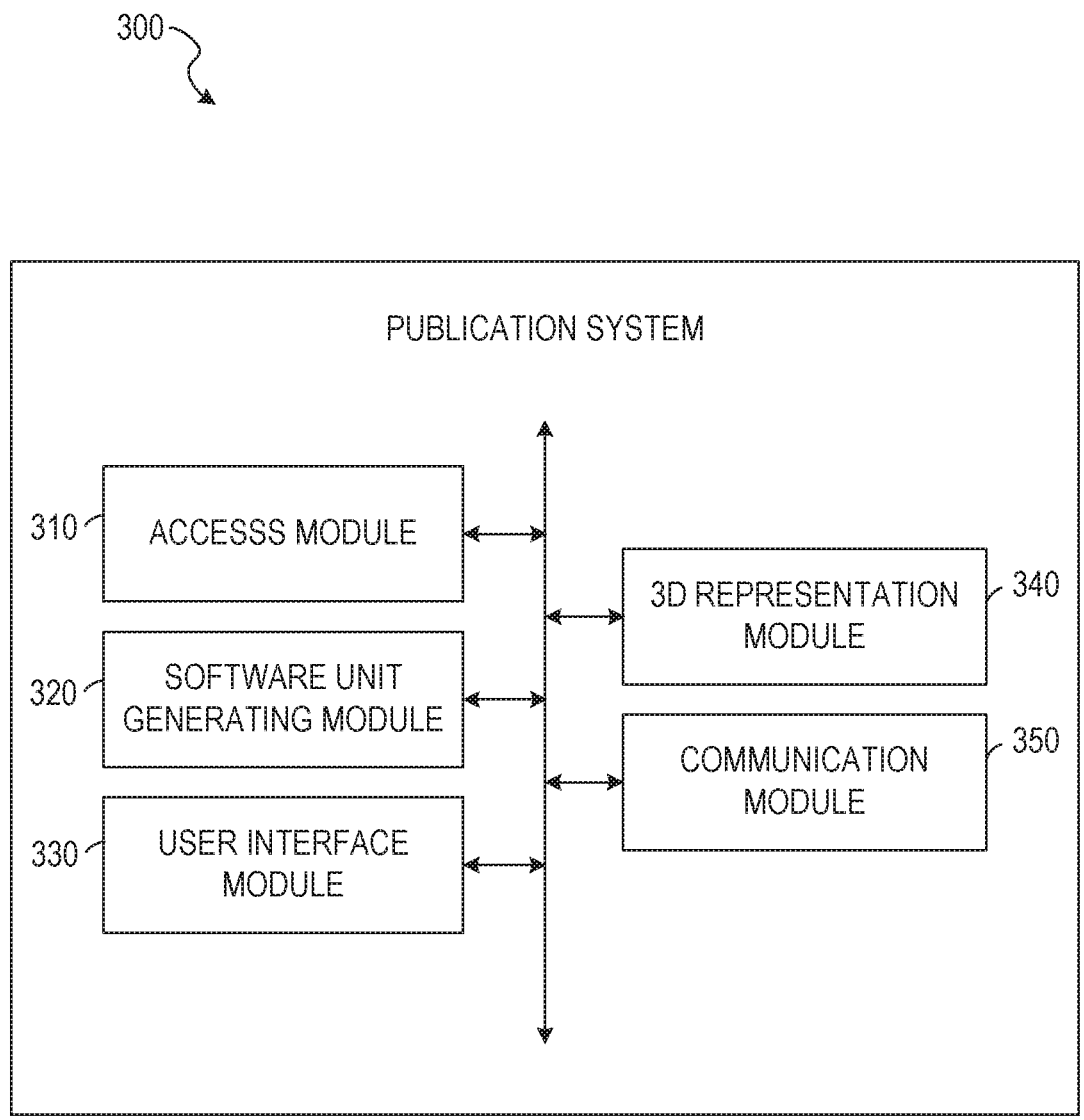
FIG. 3 is a block diagram illustrating components of a publication system, according to some example embodiments.

FIG. 3 is a block diagram illustrating components of the publication system 300, according to some example embodiments. As shown in FIG. 3, the publication system 300 includes an access module 310, a software unit generating module 320, a communication module 330, a user interface module 340, and a 3D representation module 350, all configured to communicate with each other (e.g., via a bus, shared memory, or a switch).

According to some example embodiments, the access module 310 accesses a three-dimensional representation of an item at a record of a database.

The software unit generating module 320 generates a first software unit that corresponds to the three-dimensional representation of the item. The software unit generating module 320 generates a second software unit that corresponds to an online three-dimensional platform that is pluggable to include the three-dimensional representation of the item corresponding to the first software unit. The online three-dimensional platform includes one or more pluggable slots for receiving one or more three-dimensional representations of one or more items including the three-dimensional representation of the item.

The user interface module 330 generates an enhanced user interface on the client device based on causing an execution of the first software unit and the second software unit. The causing of the execution results in a display, in the enhanced user interface of the client device, of the three-dimensional representation of the item plugged into a pluggable slot of the one or more pluggable slots of the online three-dimensional platform. The online three-dimensional platform is configured to be pluggable with the one or more three-dimensional representations of the one or more items including the three-dimensional representation of the item.

The 3D representation module 340 generates the three-dimensional representation of the item. In some example embodiments, the three-dimensional representation of the item is a 360-degree video of the item. In some example embodiments, the 360-degree video may be received from the client device. In certain example embodiments, the three-dimensional representation is generated based on input received from the client device (e.g., a file that includes a two-dimensional representation of the item, data describing the item, data pertaining to the item received from a spatial-information-capturing device such as a Kinecet™, etc.).

The communication module 350 transmits the first software unit and the second software unit to a client device. In some example embodiments, the causing of the execution of the first software unit and the second software unit is performed at the client device.

To perform one or more of its functionalities, the publication system 300 communicates with one or more other systems. For example, an integration engine (not shown) may integrate the publication system 300 with one or more email server(s), web server(s), one or more databases, or other servers, systems, or repositories.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources to allow information to be passed between the applications and to allow the applications to share and access common data. Furthermore, the modules may access one or more of the databases 226.

Figure 4:
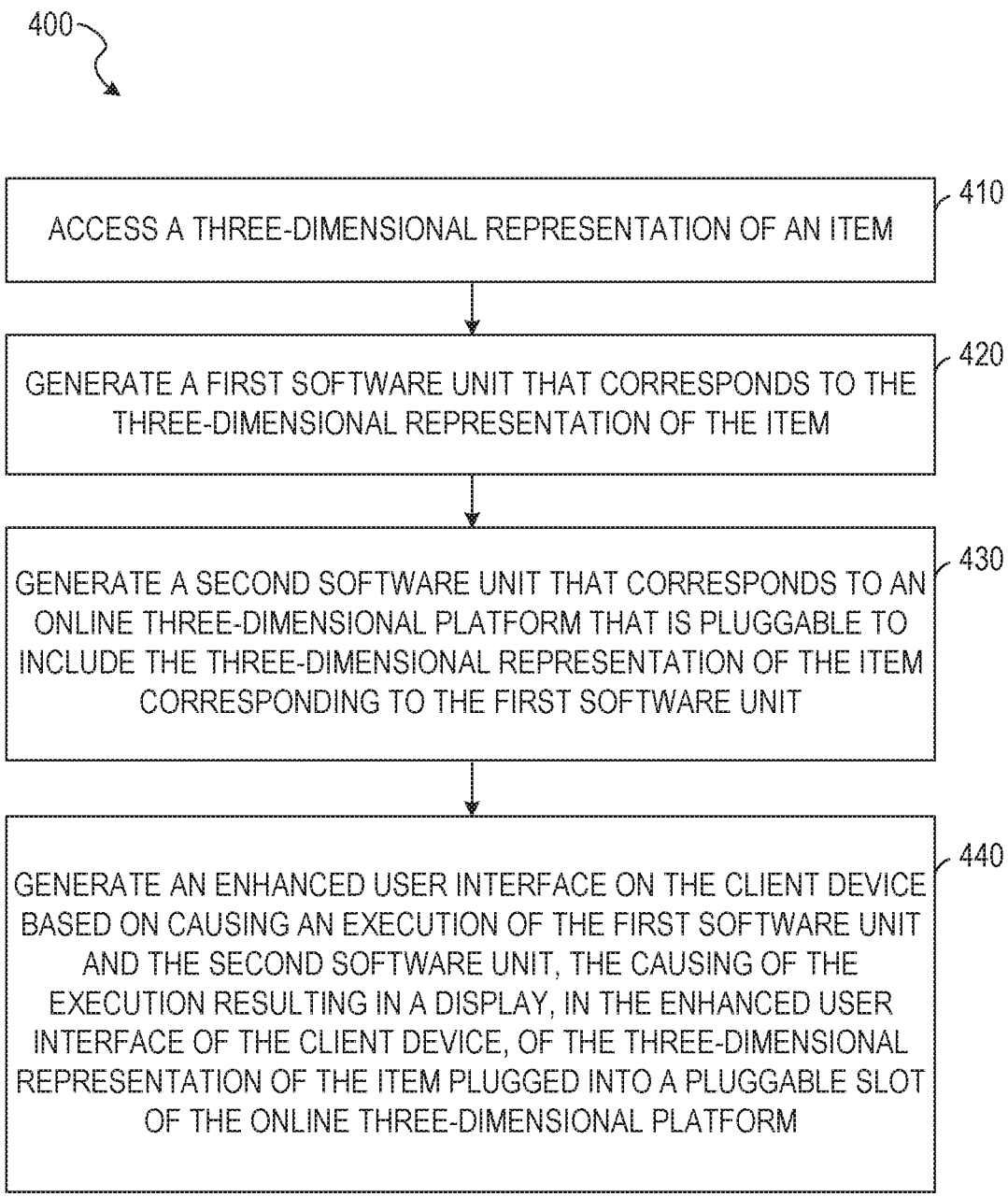
FIG. 4 is a flow diagram illustrating a method for providing an online pluggable three-dimensional platform for publication of three-dimensional representations of items, according to some example embodiments.

FIGS. 4-8 are flowcharts illustrating a method for providing an online pluggable three-dimensional platform for publication of three-dimensional representations of items, according to some example embodiments. Operations in the method 400 illustrated in FIG. 4 may be performed using modules described above with respect to FIG. 3. As shown in FIG. 4, method 400 may include one or more of method operations 410, 420, 430, and 440, according to example embodiments.

At operation 410, the access module 310 accesses a three-dimensional representation of an item at a record of a database. In some example embodiments, the three-dimensional representation of the item is a 360-degree video of the item.

At operation 420, the software unit generating module 320 generates a first software unit that corresponds to the three-dimensional representation of the item.

In some example embodiments, the access module 310 receives, from the client device, a file that includes the 360-degree video of the item. The generating of the first software unit, by the software unit generating module 320, is based on the file that includes the 360-degree video of the item.

At operation 430, the software unit generating module 320 generates a second software unit that corresponds to an online three-dimensional platform that is pluggable to include the three-dimensional representation of the item corresponding to the first software unit. The online three-dimensional platform includes one or more pluggable slots for receiving one or more three-dimensional representations of one or more items including the three-dimensional representation of the item.

At operation 440, the user interface module 330 generates an enhanced user interface on the client device based on causing an execution of the first software unit and the second software unit. The causing of the execution results in a display, in the enhanced user interface of the client device, of the three-dimensional representation of the item plugged into a pluggable slot of the one or more pluggable slots of the online three-dimensional platform. The online three-dimensional platform is configured to be pluggable with the one or more three-dimensional representations of the one or more items including the three-dimensional representation of the item.

In some example embodiments, one or more characteristics of the online three-dimensional platform are customizable at the client device (e.g., by a seller of the item). For example, a user of the 3D platform may modify the lighting (e.g., brightness, as an attribute between 0-100; color, expressed as a range between bluish white and soft, white, or expressed as a temperature 1700 k-27000 k, etc.) of the 3D platform, or the color or material of a pluggable slot, expressed as the color of the frame (e.g., green frame or white frame) of the slot, or material (e.g., wooden frame or steel frame) of the frame.

In certain example embodiments, the access module 310 receives, from the client device, a file that includes a two-dimensional representation of the item. The 3D representation module 340 generates the three-dimensional representation of the item based on the file that includes the two-dimensional representation of the item and additional data pertaining to the item (e.g., spatial data describing the item from a spatial-data-capturing device, one or more photographs of the item, measurement data pertaining to the item, brand data pertaining to the item, etc.). The generating of the first software unit, by the software unit generating module 320, is based on the three-dimensional representation of the item.

In various example embodiments, the communication module 350 provides a specification of one or more parameters pertaining to the three-dimensional representation of the item. The specification of the one or more parameters may be communicated via a browser on a client device, or via a communication transmitted to the client device. The one or more parameters, in some instances, specify one or more distance values to the item from an image capturing (or generating) device, such as a camera. The access module 310 receives, from the client device, the three-dimensional representation of the item. The received three-dimensional representation of the item is generated at the client device based on the provided specification of the one or more parameters.

In some instances, the access module 310 accesses, at a further record of the database, one or more parameters that correspond to one or more dimensions of the one or more pluggable slots of the online three-dimensional platform. The executing of the second software unit includes rendering the online three-dimensional platform including the one or more pluggable slots for receiving the one or more three-dimensional representations of the one or more items based on the one or more parameters that correspond to the one or more dimensions of the one or more pluggable slots of the online three-dimensional platform.

In certain example embodiments, the communication module 350 transmits the first software unit and the second software unit to a client device. The causing of the execution of the first software unit and the second software unit is performed at the client device.

Further details with respect to the method operations of the method 400 are described below with respect to FIGS. 5-8.

Figure 5:
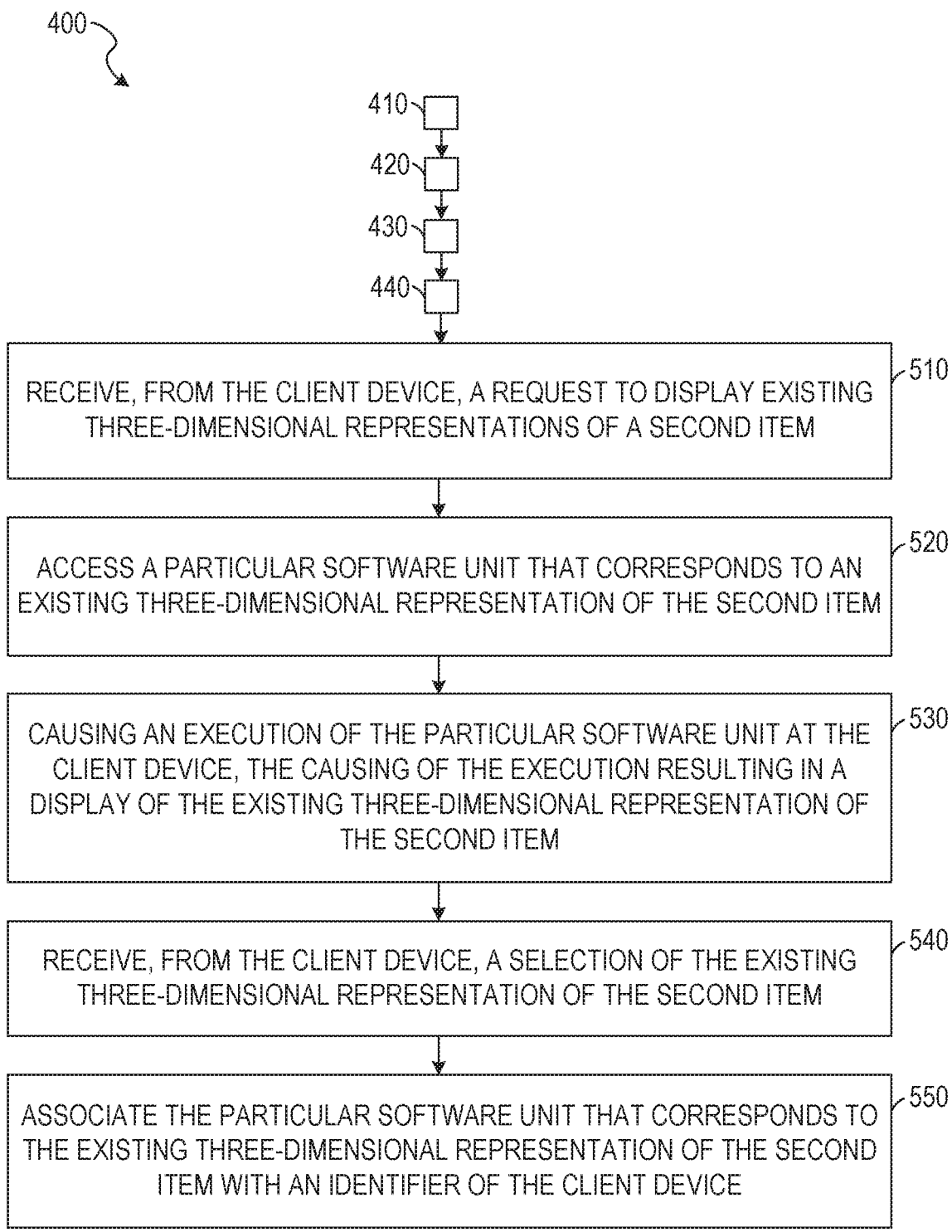
FIG. 5 is a flow diagram illustrating a method for providing an online pluggable three-dimensional platform for publication of three-dimensional representations of items, and representing additional steps of the method illustrated in FIG. 4, according to some example embodiments.

As shown in FIG. 5, method 400 includes one or more of operations 510, 520, 530, 540, or 550, according to some embodiments. Operation 510 may be performed after operation 440, in which the user interface module 330 generates an enhanced user interface on the client device based on causing an execution of the first software unit and the second software unit.

At operation 510, the access module 310 receives, from the client device, a request to display existing three-dimensional representations of a second item.

At operation 520, the access module 310 accesses, at a further record of the database, a particular software unit that corresponds to an existing three-dimensional representation of the second item.

At operation 530, the user interface module 330 causes an execution of the particular software unit at the client device. The causing of the execution results in a display of the existing three-dimensional representation of the second item in a further user interface on the client device.

At operation 540, the access module 310 receives, from the client device, a selection of the existing three-dimensional representation of the second item. The selection may be made by a user associated with the client device, via the further user interface on the client device.

At operation 550, the software unit generating module 320 associates, at the further record of the database, the particular software unit that corresponds to the existing three-dimensional representation of the second item with an identifier of the client device.

In some example embodiments, the pluggable slot is a first pluggable slot. The generating of the enhanced user interface on the client device is further based on causing an execution of the particular software unit at the client device. The causing of the execution of the particular software unit results in a display, in the enhanced user interface of the client device, of the existing three-dimensional representation of the second item plugged into a second pluggable slot of the one or more pluggable slots of the online three-dimensional platform.

In various example embodiments, the receiving, from the client device, of the selection of the existing three-dimensional representation of the second item includes: receiving, from the client device, a request to modify one or more attributes (e.g., lighting, orientation, background, etc.) of the three-dimensional representation of the second item; and modifying, based on the request to modify, the one or more attributes of the three-dimensional representation of the second item in a data structure associated with the three-dimensional representation of the second item.

Figure 6:
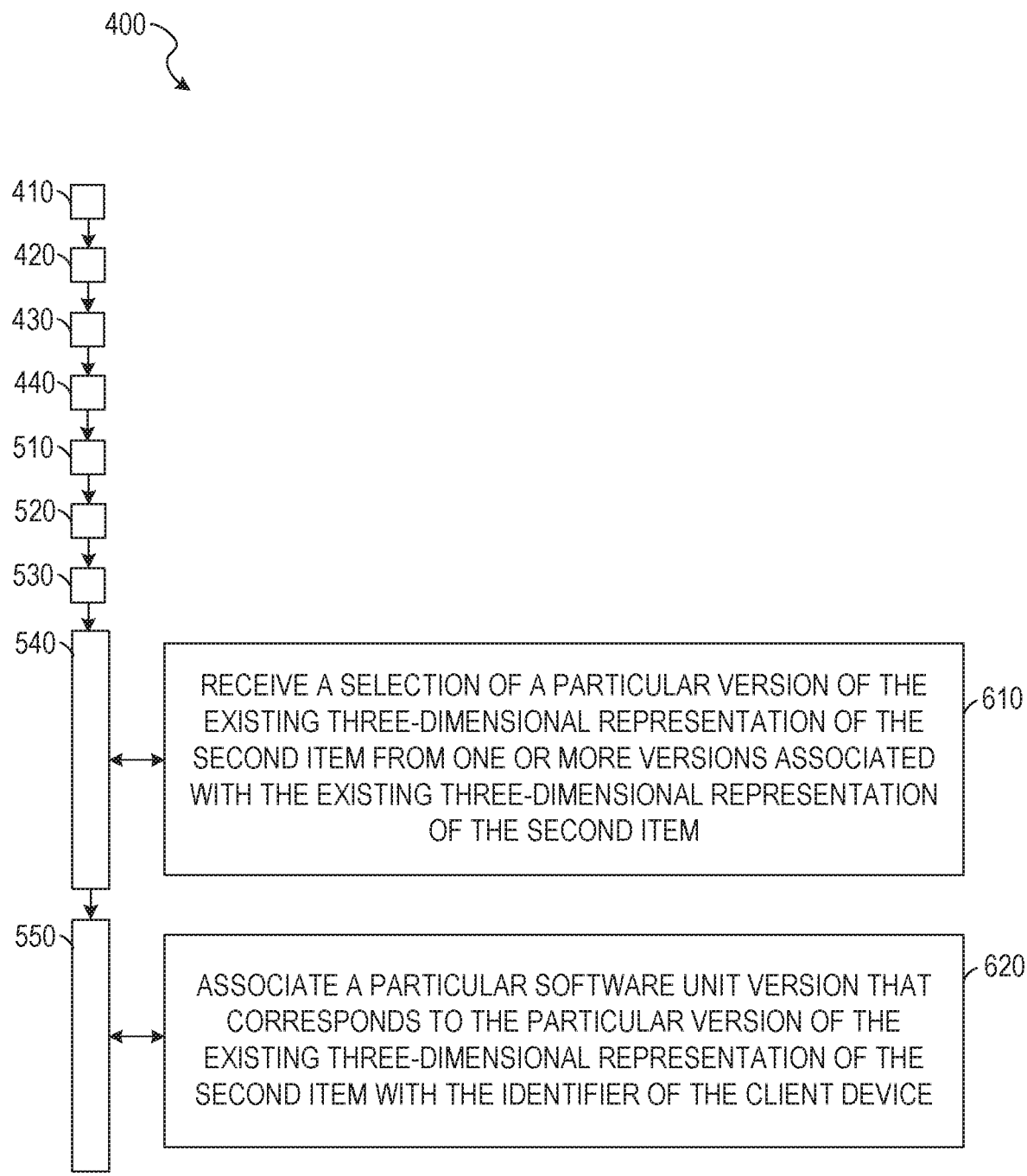
FIG. 6 is a flow diagram illustrating a method for providing an online pluggable three-dimensional platform for publication of three-dimensional representations of items, and representing steps 540 and 550 of the method illustrated in FIG. 5 in more detail, according to some example embodiments.

As shown in FIG. 6, method 400 includes operations 610 and 620, according to some embodiments. Operation 610 is performed as part (e.g., a precursor task, a subroutine, or a portion) of operation 540 of FIG. 5, in which the access module 310 receives, from the client device, a selection of the existing three-dimensional representation of the second item.

In some instances, the existing three-dimensional representations of the second item are associated with one or more versions. The receiving of the selection of the existing three-dimensional representation of the second item includes receiving a selection of a particular version of the existing three-dimensional representation of the second item from one or more versions associated with the existing three-dimensional representation of the second item.

Operation 620 is performed as part (e.g., a precursor task, a subroutine, or a portion) of operation 550 of FIG. 5, in which the software unit generating module 320 associates, at the further record of the database, the particular software unit that corresponds to the existing three-dimensional representation of the second item with an identifier of the client device. The associating of the particular software unit with the identifier of the client device includes associating a particular software unit version that corresponds to the particular version of the existing three-dimensional representation of the second item with the identifier of the client device.

Figure 7:
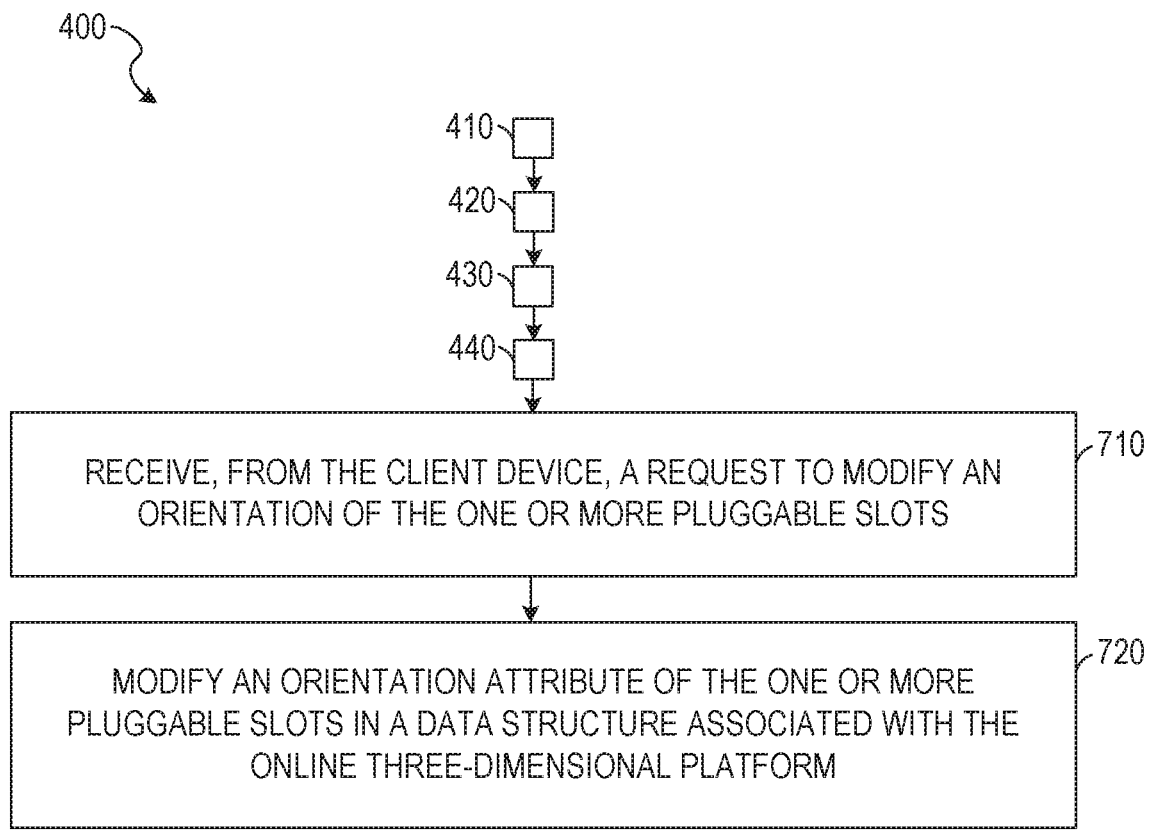
FIG. 7 is a flow diagram illustrating a method for providing an online pluggable three-dimensional platform for publication of three-dimensional representations of items, and representing additional steps of the method illustrated in FIG. 4, according to some example embodiments.

As shown in FIG. 7, method 400 includes operations 710 and 720, according to some embodiments. Operation 710 may be performed after operation 440, in which the user interface module 330 generates an enhanced user interface on the client device based on causing an execution of the first software unit and the second software unit.

At operation 710, the access module 310 receives, from the client device, a request to modify an orientation of the one or more pluggable slots. In some example embodiments, the request to modify the orientation is a request to modify the orientation of the 3D representation (e.g., the object model) to be placed inside the slot. Modifying the orientation of the 3D representation (or of the slot) may include rotating the 3D representation (or the slot) a particular number of degrees around one or more of the axes of the 3D representation (or of the slot).

At operation 720, the software unit generation module 320 modifies, based on the request to modify, an orientation attribute (e.g., number of degrees, an identifier of an axis, etc.) of the one or more pluggable slots (or one or more 3D representations) in a data structure associated with the online three-dimensional platform.

Figure 8:
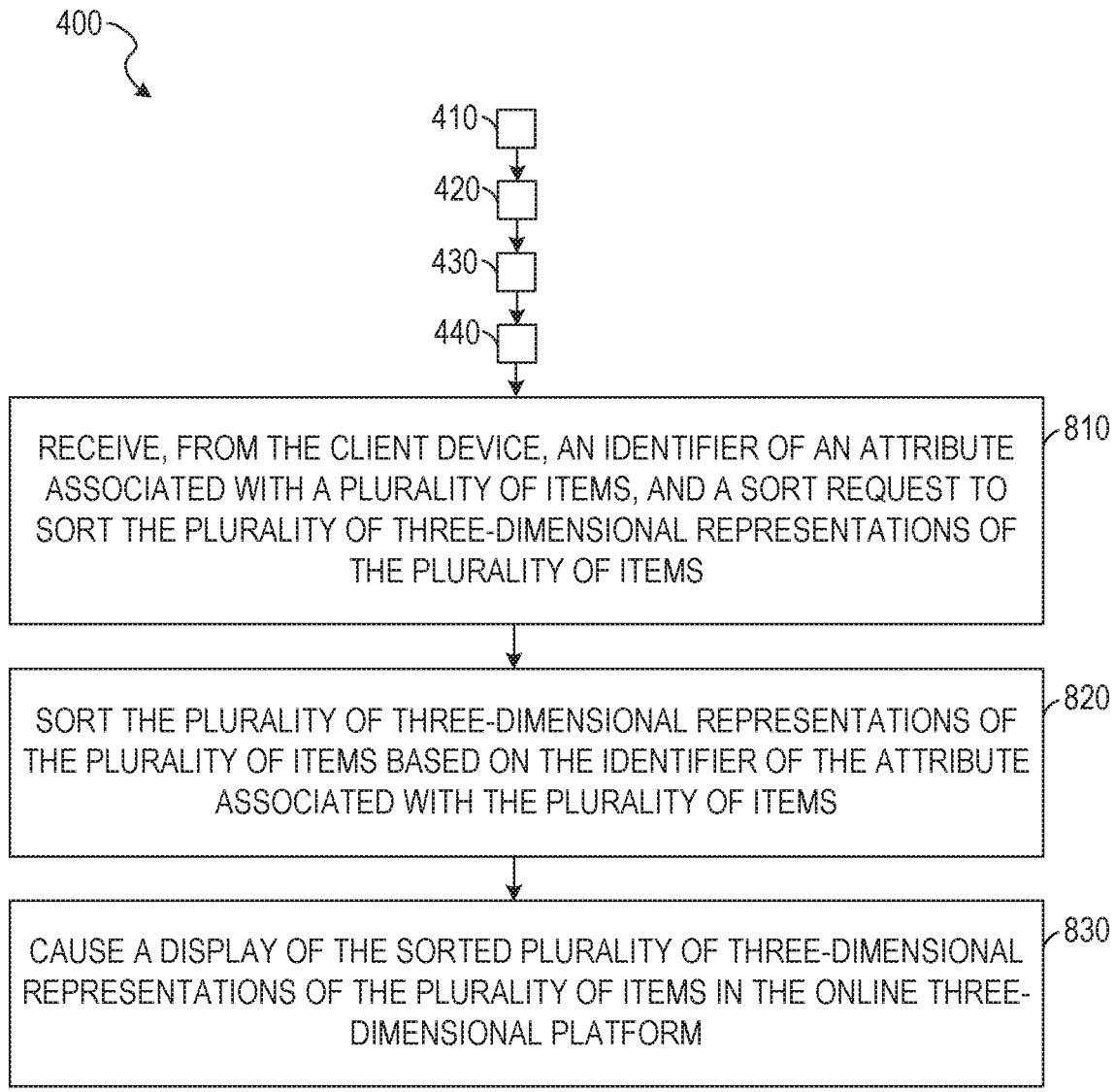
FIG. 8 is a flow diagram illustrating a method for providing an online pluggable three-dimensional platform for publication of three-dimensional representations of items, and representing additional steps of the method illustrated in FIG. 4, according to some example embodiments.

As shown in FIG. 8, method 400 may include operations 810, 820, and 830, according to some embodiments. Operation 810 is performed after operation 440, in which the user interface module 330 generates an enhanced user interface on the client device based on causing an execution of the first software unit and the second software unit.

At operation 810, the access module 310 receives, from the client device, an identifier of an attribute associated with a plurality of items associated with a plurality of three-dimensional representations of the plurality of items including the three-dimensional representation of the item, and a sort request to sort the plurality of three-dimensional representations of the plurality of items. Examples of an attribute are be a lowest price, a highest price, a combination of price and shipping charge, distance to buyer, etc.

At operation 820, the user interface 330 sorts the plurality of three-dimensional representations of the plurality of items based on the identifier of the attribute associated with the plurality of items. The sorting results in a sorted plurality of three-dimensional representations of the plurality of items.

At operation 830, the user interface 340 causes a display of the sorted plurality of three-dimensional representations of the plurality of items in the online three-dimensional platform displayed in the enhanced user interface of the client device. The causing of the display of the sorted plurality of three-dimensional representations of the plurality of items in the online three-dimensional platform is performed in response to the request to sort the plurality of three-dimensional representations of the plurality of items.

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 9:
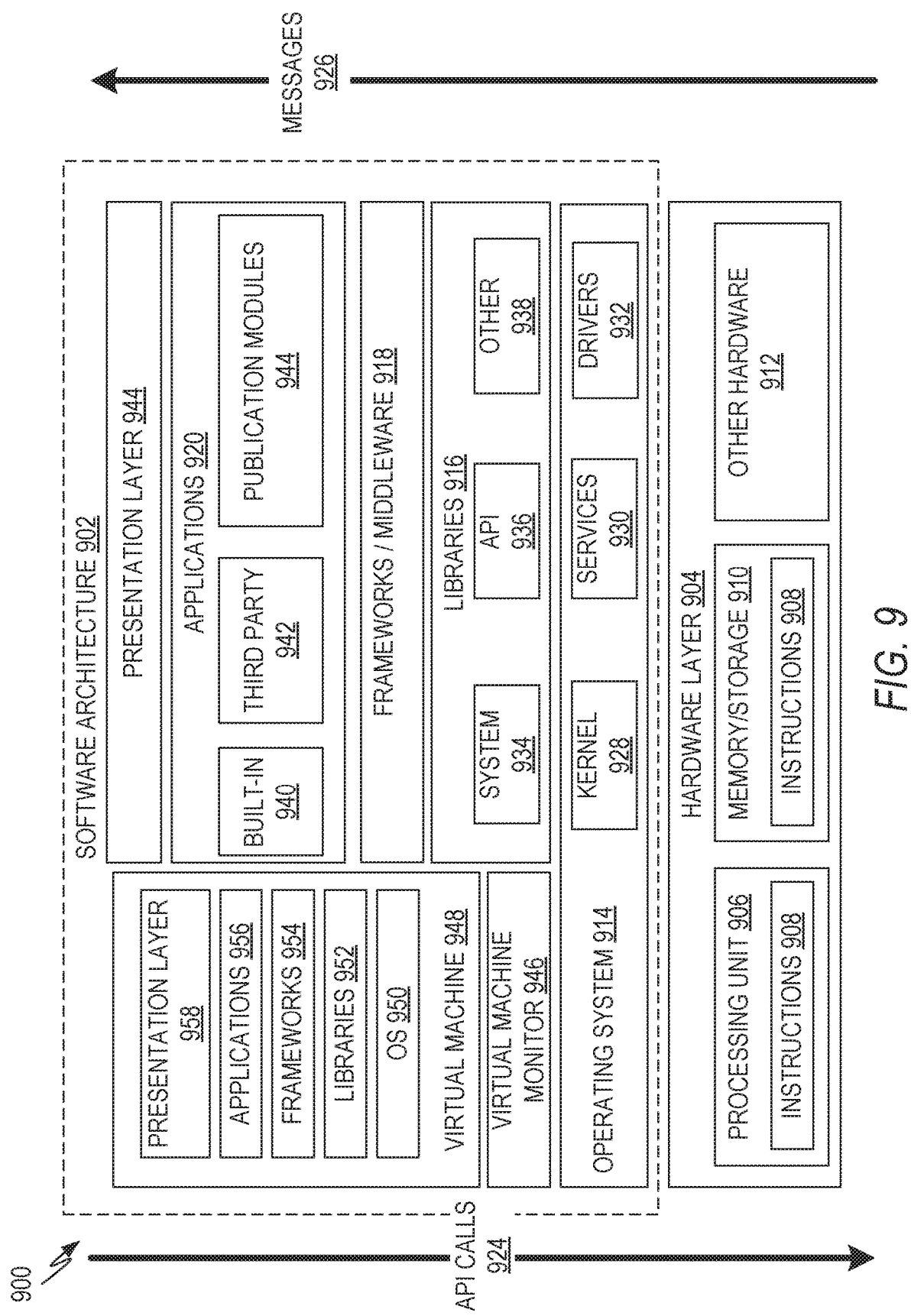
FIG. 9 is a block diagram illustrating an example of a software architecture that may be installed on a machine, according to some example embodiments.
Figure 10:
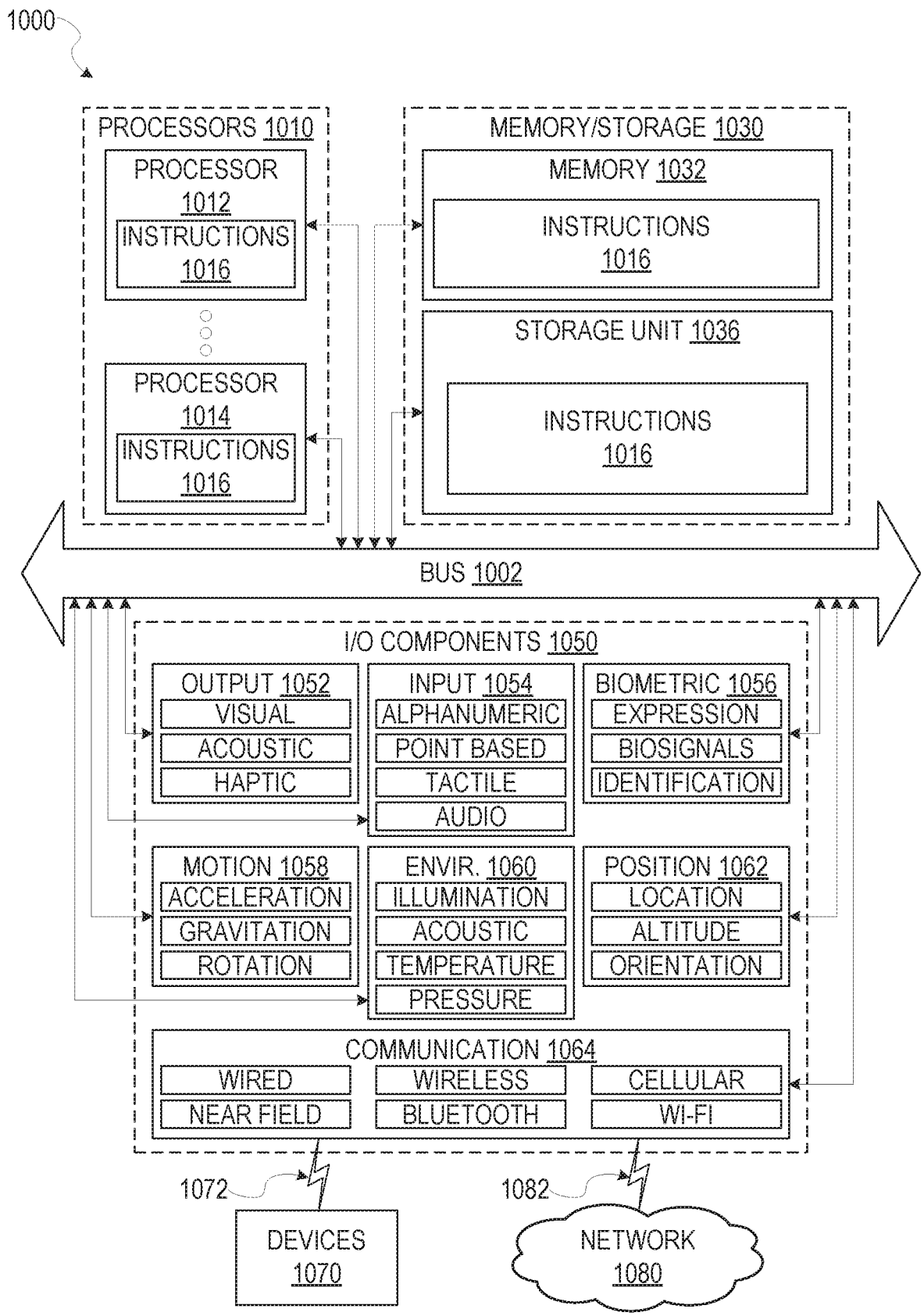
FIG. 10 illustrates a diagrammatic representation of a machine in the form of a computer system within which a set of instructions may be executed for causing the machine to perform any one or more of the methodologies discussed herein, according to an example embodiment.

The modules, methods, applications and so forth described in conjunction with FIGS. 9-10 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

FIG. 9 is a block diagram 900 illustrating a representative software architecture 902, which may be used in conjunction with various hardware architectures herein described. FIG. 9 is merely a non-limiting example of a software architecture and it will be appreciated that many other architectures may be implemented to facilitate the functionality described herein. The software architecture 902 may be executing on hardware such as machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. Executable instructions 908 represent the executable instructions of the software architecture 902, including implementation of the methods, modules and so forth of FIGS. 1-8. Hardware layer 904 also includes memory and/or storage modules 910, which also have executable instructions 908. Hardware layer 904 may also comprise other hardware as indicated by 912 which represents any other hardware of the hardware layer 904, such as the other hardware illustrated as part of machine 1000.

In the example architecture of FIG. 9, the software 902 may be conceptualized as a stack of layers where each layer provides particular functionality. For example, the software 902 may include layers such as an operating system 914, libraries 916, frameworks/middleware 918, applications 920 and presentation layer 922. Operationally, the applications 920 and/or other components within the layers may invoke application programming interface (API) calls 924 through the software stack and receive a response, returned values, and so forth illustrated as messages 926 in response to the API calls 924. The layers illustrated are representative in nature, and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system 934 libraries (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940, third party applications 942, and publication modules 944 (e.g., access module 310, software unit generating module 320, communication module 330, user interface module 340, or 3D representation module 350). Examples of representative built-in applications 940 may include, but are not limited to, a contacts application, a browser application, a book reader application, a location application, a media application, a messaging application, and/or a game application. Third party applications 942 may include any of the built in applications as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as operating system 914 to facilitate functionality described herein.

The applications 920 may utilize built in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware machine (such as the machine of FIG. 10, for example). A virtual machine is hosted by a host operating system (operating system 914 in FIG. 10) and typically, although not always, has a virtual machine monitor 946, which manages the operation of the virtual machine as well as the interface with the host operating system (i.e., operating system 914). A software architecture executes within the virtual machine such as an operating system 950, libraries 952, frameworks/middleware 954, applications 956 and/or presentation layer 958. These layers of software architecture executing within the virtual machine 948 can be the same as corresponding layers previously described or may be different.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 4-8. Additionally, or alternatively, the instructions may implement the access module 310, the software unit generating module 320, the communication module 330, the user interface module 340, and the 3D representation module 350 of FIG. 3. The instructions transform the general, non-programmed machine into a particular machine programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, at a first computing device, user input to position an item listed by an online three-dimensional storefront into a pluggable slot of a plurality of pluggable slots of the online three-dimensional storefront, wherein each of the plurality of pluggable slots of the online three-dimensional storefront have a same size and form as defined by a specification of the online three-dimensional storefront;
   storing a three-dimensional representation of the item in a database associated with the online three-dimensional storefront and associating the three-dimensional representation of the item with the pluggable slot;
   accessing the three-dimensional representation of the item from the database associated with the online three-dimensional storefront;
   generating a first software unit that corresponds to the three-dimensional representation of the item;
   generating a second software unit that corresponds to the online three-dimensional storefront that is pluggable to include the three-dimensional representation of the item corresponding to the first software unit;
   generating a user interface for display at a second computing device that is remote from the first computing device by causing execution of the first software unit and the second software unit, the user interface including the three-dimensional representation of the item plugged into the associated pluggable slot of the online three-dimensional storefront;
   receiving additional input, at the first computing device, to move the item from the pluggable slot to a different pluggable slot of the plurality of pluggable slots of the online three-dimensional storefront; and
   responsive to the additional input, moving the item from the pluggable slot to the different pluggable slot of the plurality of pluggable slots of the online three-dimensional storefront such that the user interface generated for display at the second computing device is modified to display the three-dimensional representation of the item plugged into the different pluggable slot of the online three-dimensional storefront.

2. The method of claim 1, wherein the three-dimensional representation of the item is a 360-degree video of the item.

3. The method of claim 2, further comprising receiving a file that includes the 360-degree video of the item, wherein the generating of the first software unit is based on the file that includes the 360-degree video of the item.

4. The method of claim 1, further comprising receiving a file that includes a two-dimensional representation of the item, and wherein the method further comprises generating the three-dimensional representation of the item based on the file that includes the two-dimensional representation of the item and additional data pertaining to the item.

5. The method of claim 1, further comprising:
   providing a specification of one or more parameters pertaining to the three-dimensional representation of the item; and
   receiving the three-dimensional representation of the item, wherein the received three-dimensional representation of the item is generated based on the provided specification of the one or more parameters.

6. The method of claim 5, further comprising accessing, at the database, one or more parameters that correspond to one or more dimensions of the pluggable slots of the online three-dimensional storefront, wherein the causing execution of the second software unit includes rendering the online three-dimensional storefront including the pluggable slots for receiving the one or more three-dimensional representations of the one or more items based on the one or more parameters that correspond to the one or more dimensions of the pluggable slots of the online three-dimensional storefront.

7. The method of claim 1, wherein the item is a first item, the method further comprising:
receiving a request to display existing three-dimensional representations of a second item;
accessing, at the database, a particular software unit that corresponds to an existing three-dimensional representation of the second item;
causing an execution of the particular software unit at the first computing device, the causing of the execution resulting in a display of the existing three-dimensional representation of the second item in a further user interface on the first computing device;
receiving, from the first computing device, a selection of the existing three-dimensional representation of the second item; and
associating the particular software unit that corresponds to the existing three-dimensional representation of the second item with an identifier of the first computing device.

8. The method of claim 7, wherein the pluggable slot is a first pluggable slot, and wherein the generating of the user interface on the first computing device is further based on causing an execution of the particular software unit at the first computing device, the causing of the execution of the particular software unit resulting in a display, in the user interface of the first computing device, of the existing three-dimensional representation of the second item plugged into a second pluggable slot of the pluggable slots of the online three-dimensional storefront.

9. The method of claim 7, wherein the receiving the selection of the existing three-dimensional representation of the second item includes:
receiving a request to modify one or more attributes of the three-dimensional representation of the second item; and
modifying, based on the request to modify, the one or more attributes of the three-dimensional representation of the second item in a data structure associated with the three-dimensional representation of the second item.

10. The method of claim 7, wherein the existing three-dimensional representations of the second item are associated with one or more versions, wherein the receiving of the selection of the existing three-dimensional representation of the second item includes receiving a selection of a particular version of the existing three-dimensional representation of the second item from one or more versions associated with the existing three-dimensional representation of the second item, and wherein the associating of the particular software unit with the identifier of the first computing device includes associating a particular software unit version that corresponds to the particular version of the existing three-dimensional representation of the second item with the identifier of the first computing device.

11. The method of claim 1, further comprising:
receiving a request to modify an orientation of the pluggable slots; and modifying, based on the request to modify, an orientation attribute of the pluggable slots in a data structure associated with the online three-dimensional storefront.

12. The method of claim 1, further comprising:
receiving an identifier of an attribute associated with a plurality of items associated with a plurality of three-dimensional representations of the plurality of items including the three-dimensional representation of the item, and a sort request to sort the plurality of three-dimensional representations of the plurality of items;
sorting the plurality of three-dimensional representations of the plurality of items based on the identifier of the attribute associated with the plurality of items, the sorting resulting in a sorted plurality of three-dimensional representations of the plurality of items; and
causing a display of the sorted plurality of three-dimensional representations of the plurality of items in the online three-dimensional storefront displayed in the user interface of the first computing device.

13. The method of claim 1, wherein the pluggable slots are configured to be plugged or unplugged with different three-dimensional representations of items.

14. The method of claim 1, wherein the online three-dimensional storefront corresponds to an online store associated with a seller of one or more items.

15. The method of claim 1, wherein the user input includes a two-dimensional representation of the item, and wherein the method further comprises generating the three-dimensional representation of the item based on the two-dimensional representation of the item.

16. The method of claim 1, wherein the input and the additional input comprises drag and drop input, and wherein the first computing device is associated with an administrator of the online three-dimensional storefront.

17. The method of claim 1, further comprising, responsive to the additional input updating the user interface to include the three-dimensional representation of the item plugged into the different pluggable slot of the online three-dimensional storefront.

18. The method of claim 1, wherein each pluggable slot has a 3D appearance and is the same form and size.

19. A system comprising:
one or more hardware processors; and
a machine-readable medium for storing instructions that, when executed by the one or more hardware processors, cause the one or more hardware processors to perform operations comprising:
receiving, at a first computing device, user input to position an item listed by an online three-dimensional storefront into a pluggable slot of a plurality of pluggable slots of the online three-dimensional storefront, wherein each of the plurality of pluggable slots of the online three-dimensional storefront are configured with a same size and form as defined by a specification of the online three-dimensional storefront;
storing a three-dimensional representation of the item in a database associated with the online three-dimensional storefront and associating the three-dimensional representation of the item with the pluggable slot;
accessing the three-dimensional representation of the item from the database associated with the online three-dimensional storefront and generating a first software unit that corresponds to the three-dimensional representation of the item;

generating a second software unit that corresponds to the online three-dimensional storefront that is pluggable to include the three-dimensional representation of the item corresponding to the first software unit; and generating a user interface for display at a second computing device that is remote from the first computing device by causing execution of the first software unit and the second software unit, the user interface including the three-dimensional representation of the item plugged into the associated pluggable slot of the online three-dimensional storefront, wherein the configuring the plurality of pluggable slots with the same size and form defined by the specification enables movement of the three-dimensional representation of the item from the pluggable slot to a different pluggable slot of the plurality of pluggable slots of the online three-dimensional storefront without modifying the size of the three-dimensional representation of the item.

20. A non-transitory machine-readable storage medium comprising instructions that, when executed by one or more hardware processors of a first computing device, cause the one or more hardware processors to perform operations comprising:

receiving, at the first computing device, user input to position an item listed by an online three-dimensional storefront into a pluggable slot of a plurality of pluggable slots of the online three-dimensional storefront, wherein each of the plurality of pluggable slots of the online three-dimensional storefront have a same size and form as defined by a specification of the online three-dimensional storefront;

storing a three-dimensional representation of the item in a database associated with the online three-dimensional storefront and associating the three-dimensional representation of the item with the pluggable slot;

accessing the three-dimensional representation of the item from the database associated with the online three-dimensional storefront;

generating a first software unit that corresponds to the three-dimensional representation of the item;

generating a second software unit that corresponds to the online three-dimensional storefront that is pluggable to include the three-dimensional representation of the item corresponding to the first software unit;

generating a user interface for display at a second computing device that is remote from the first computing device by causing execution of the first software unit and the second software unit, the user interface including the three-dimensional representation of the item plugged into the associated pluggable slot of the online three-dimensional storefront;

receiving additional input, at the first computing device, to move the item from the pluggable slot to a different pluggable slot of the plurality of pluggable slots of the online three-dimensional storefront; and responsive to the additional input, moving the item from the pluggable slot to the different pluggable slot of the plurality of pluggable slots of the online three-dimensional storefront such that the user interface generated for display at the second computing device is modified to display the three-dimensional representation of the item plugged into the different pluggable slot of the online three-dimensional storefront.

\* \* \* \* \*